US012736197B2

(12) United States Patent
Kim et al.

(10) Patent No.: US 12,736,197 B2
(45) Date of Patent: Sep. 15, 2026

(54) LIGHTING DEVICE FOR VEHICLE

(71) Applicant: HYUNDAI MOBIS CO., LTD., Seoul (KR)

(72) Inventors: Do Hyung Kim, Yongin-si (KR); Min Ji Kim, Yongin-si (KR); Phil Su Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/249,443

(22) Filed: Jun. 25, 2025

(65) Prior Publication Data

US 2025/0320977 A1 Oct. 16, 2025

Related U.S. Application Data

(63) Continuation of application No. 18/921,282, filed on Oct. 21, 2024, now Pat. No. 12,379,086.

(30) Foreign Application Priority Data

Feb. 6, 2024 (KR) ........................ 10-2024-0018177

(51) Int. Cl.

| | |
|---|---|
| ***F21S 41/00*** | (2018.01) |
| ***B60R 19/52*** | (2006.01) |
| ***F21S 41/14*** | (2018.01) |
| ***F21S 41/275*** | (2018.01) |
| *F21W 102/13* | (2018.01) |
| *F21Y 115/10* | (2016.01) |

(52) U.S. Cl.
CPC ............ *F21S 41/275* (2018.01); *B60R 19/52* (2013.01); *F21S 41/18* (2018.01); *B60R 2019/525* (2013.01); *F21W 2102/13* (2018.01); *F21Y 2115/10* (2016.08)

(58) Field of Classification Search
CPC .......... F21S 41/275; F21S 41/18; B60R 19/52
See application file for complete search history.

(56) References Cited

U.S. PATENT DOCUMENTS

| | | | | |
|---|---|---|---|---|
| 8,282,222 | B2 * | 10/2012 | Smits | H04N 9/3194 353/85 |
| 10,775,011 | B2 | 9/2020 | Kamiya et al. | |
| 11,035,540 | B2 | 6/2021 | Kim et al. | |
| 11,654,824 | B1 | 5/2023 | Dudar | |
| 2015/0156448 | A1 | 6/2015 | Lee | |
| 2017/0240096 | A1 | 8/2017 | Ross et al. | |
| 2017/0297502 | A1 | 10/2017 | Kim et al. | |
| 2018/0090039 | A1 * | 3/2018 | Singireddy | G09F 21/04 |
| 2018/0328564 | A1 | 11/2018 | Albou et al. | |
| 2020/0386381 | A1 * | 12/2020 | Aizawa | F21S 43/50 |
| 2021/0254806 | A1 | 8/2021 | Choi et al. | |

(Continued)

FOREIGN PATENT DOCUMENTS

| | | | |
|---|---|---|---|
| DE | 102023107164 | A1 | 9/2024 |
| KR | 10-2023-0077201 | A | 6/2023 |

*Primary Examiner* — Gerald J Sufleta, II
(74) *Attorney, Agent, or Firm* — Morgan, Lewis & Bockius LLP

(57) ABSTRACT

Disclosed is a lighting device for a vehicle according to the present disclosure including: an outer lens mounted on a grille provided on a front part of a vehicle body; a projector positioned within the outer lens and configured to project an image onto the outer lens; and a lamp arranged between the outer lens and the projector and configured to emit light toward the outer lens.

17 Claims, 7 Drawing Sheets

(56) References Cited

U.S. PATENT DOCUMENTS

| | | | | |
|---|---|---|---|---|
| 2022/0154909 | A1 | 5/2022 | Tischler et al. | |
| 2022/0355730 | A1* | 11/2022 | Singh | B60Q 1/5037 |
| 2024/0027046 | A1 | 1/2024 | Calais | |
| 2024/0191859 | A1 | 6/2024 | Kim | |
| 2024/0375738 | A1* | 11/2024 | Tawara | B62J 6/026 |

* cited by examiner

LIGHTING DEVICE FOR VEHICLE

CROSS-REFERENCE TO RELATED APPLICATION

The present application is a continuation of U.S. patent application Ser. No. 18/921,282, filed Oct. 21, 2024, which is based on and claims priority benefit under 35 USC § 119 of Korean Patent Application No. 10-2024-0018177, filed on Feb. 6, 2024, in the Korean Intellectual Property Office, the entire disclosure of which is incorporated by reference for all purposes.

BACKGROUND

Technical Field

Exemplary embodiments of the present disclosure relate to a lighting device for a vehicle, and more particularly, to a lighting device for a vehicle, which may implement grille lighting.

Description of the Related Art

In recent years, vehicle manufacturers have sought to compensate for the reduced visual density at the front of an electric vehicle with a distinctive illuminated image and add new value to the space where a grille used to be on the electric vehicle through unexpected effects, and have invested heavily in 3D stereoscopic grille lighting for an eye-catching visual effect.

Conventionally, there have been limitations in terms of grille lighting content and technological implementation solutions that may effectively express a brand identity. Furthermore, as the lighting area has expanded to include the grille, various issues have arisen, including increased development and production costs, weight gain due to the use of multiple illuminating devices, and the like. Thus, there is a need for improvement to resolve these limitations and issues.

The related art of the present disclosure is disclosed in Korean Patent Application Publication No. 10-2023-0077201 (published on Jun. 1, 2023 and entitled "THE LIGHTING GRILLE FOR THE ELECTRIC VEHICLE").

SUMMARY

An objective of the present disclosure is to provide a lighting device for a vehicle, which may provide a three-dimensional image to a driver, a nearby vehicle, and a pedestrian through implementation of grille lighting.

A lighting device for a vehicle according to the present disclosure includes: an outer lens mounted on a grille provided on a front part of a vehicle body; a projector positioned within the outer lens and configured to project an image onto the outer lens; and a lamp arranged between the outer lens and the projector and configured to emit light toward the outer lens.

The outer lens may include a lens made of a transparent material and a film, coupled to the lens, onto which the image is projected.

The film may be made of a translucent material.

the film may be provided on a surface, facing an inner side of the front part of the vehicle body, of the lens.

The image may be varied at the boundary between the lens and the film.

The image may be displayed as a three-dimensional light-emitting image through synthesizing light emitted from the lamp and light emitted from the projector.

The lighting device for a vehicle may further include a controller electrically connected to the projector and configured to control an operation of the projector by receiving an operating signal from a vehicle electronic component.

The lamp may include a first lamp arranged at a first position of the grille and a second lamp arranged at a second position spaced apart from the first position. The first lamp and the second lamp may be arranged vertically.

The first lamp and the second lamp may be arranged on both sides of the grille, respectively.

The present disclosure may generate a high-dimensional image by combining the light from the lamp and the lighting effect from the projector.

The present disclosure may also offer distinctive product quality by providing both non-illuminated and illuminated images, as well as various distinctive lighting effects depending on the mode.

The present disclosure may also enable weight reduction and structural simplification by replacing a conventional complex injection-molded structure used for producing a lighting effect with a visual effect.

DETAILED DESCRIPTION

Figure 1:
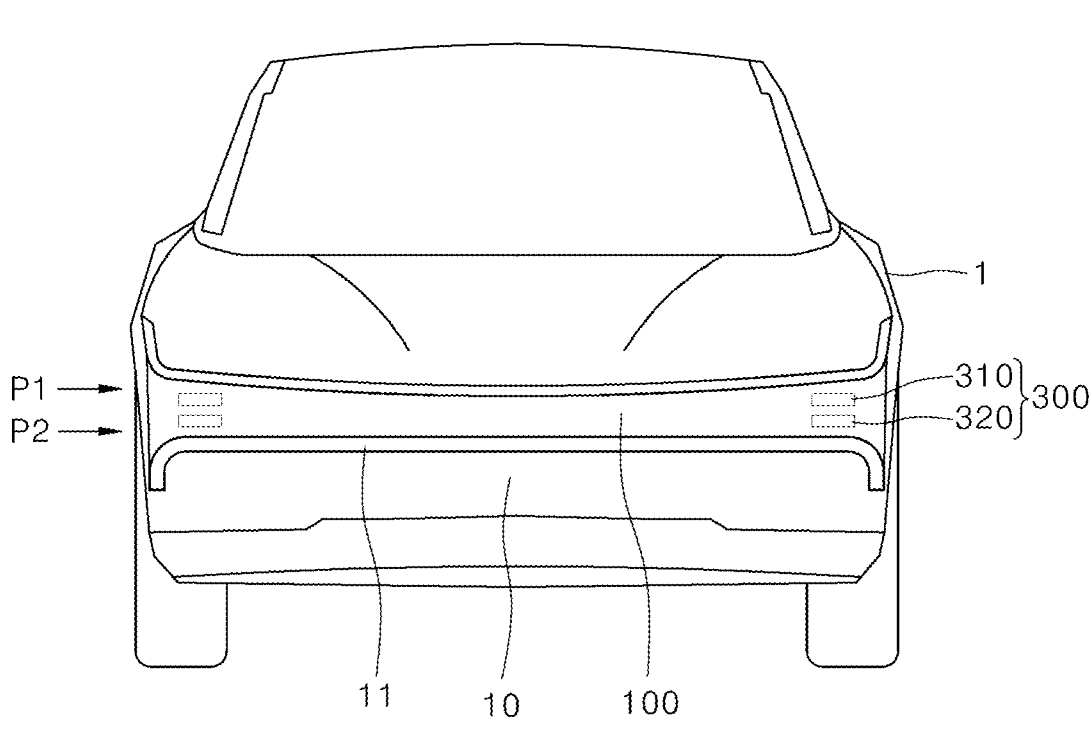
FIG. 1 is a front view of a lighting device for a vehicle according to embodiments of the present disclosure, when viewed from the front of a vehicle body.

Hereinafter, a lighting device for a vehicle will be described with reference to the accompanying drawings through various exemplary embodiments. It should be considered that the thickness of each line or the size of each component in the drawings may be exaggeratedly illustrated for clarity and convenience of description. In addition, the terms as used herein are defined in consideration of functions thereof in the present disclosure, and these terms may change depending on a user or operator's intention or practice. Therefore, these terms should be defined based on the entirety of the disclosure set forth herein.

Figure 2:
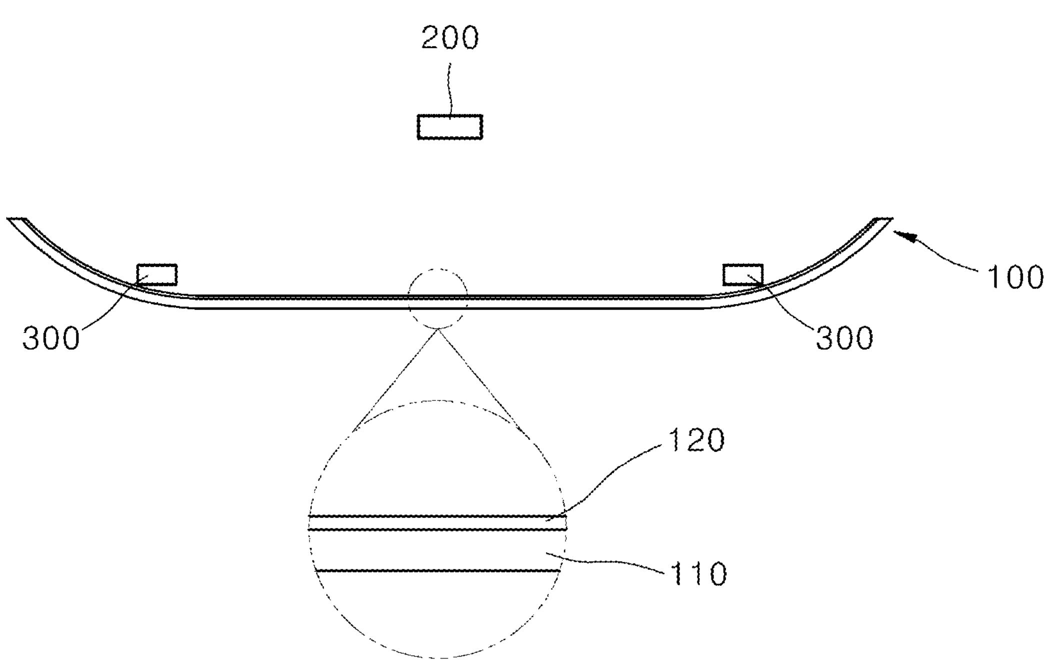
FIG. 2 is a top view of the lighting device for a vehicle according to embodiments of the present disclosure, when viewed from above the vehicle body.
Figure 3:
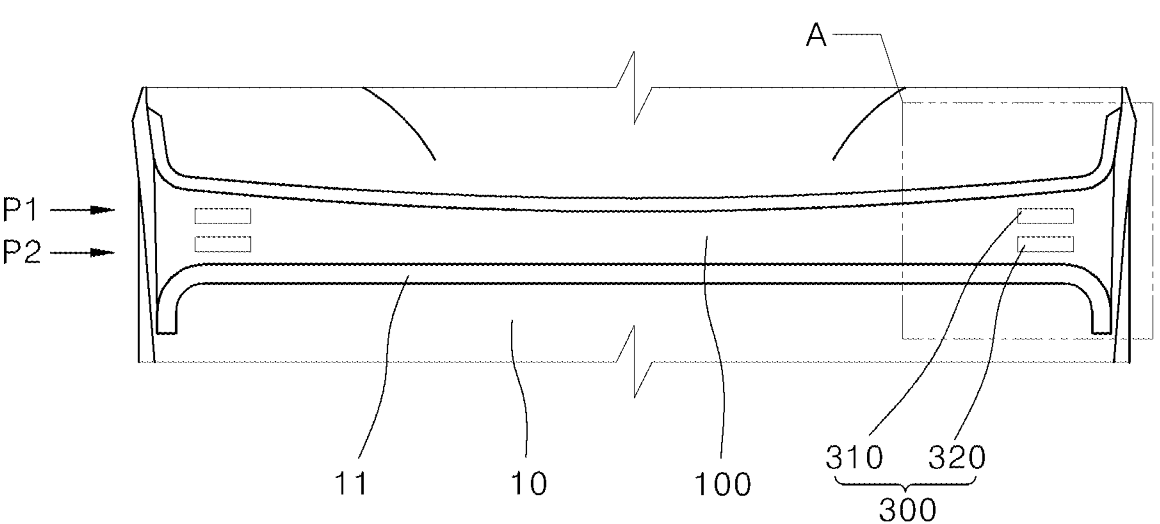
FIG. 3 is a front view showing a projector in a turned-off state in the lighting device for a vehicle according to embodiments of the present disclosure.
Figure 4:
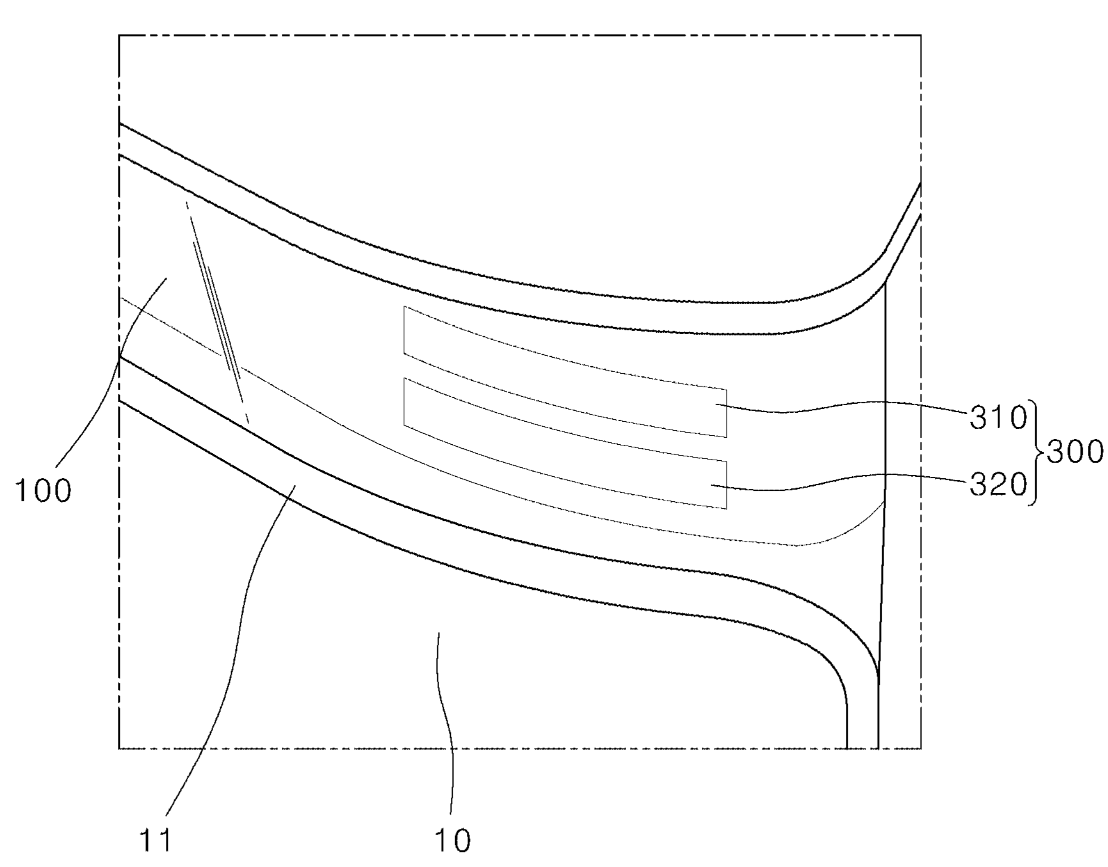
FIG. 4 is an enlarged perspective view of portion A of FIG. 3.
Figure 5:
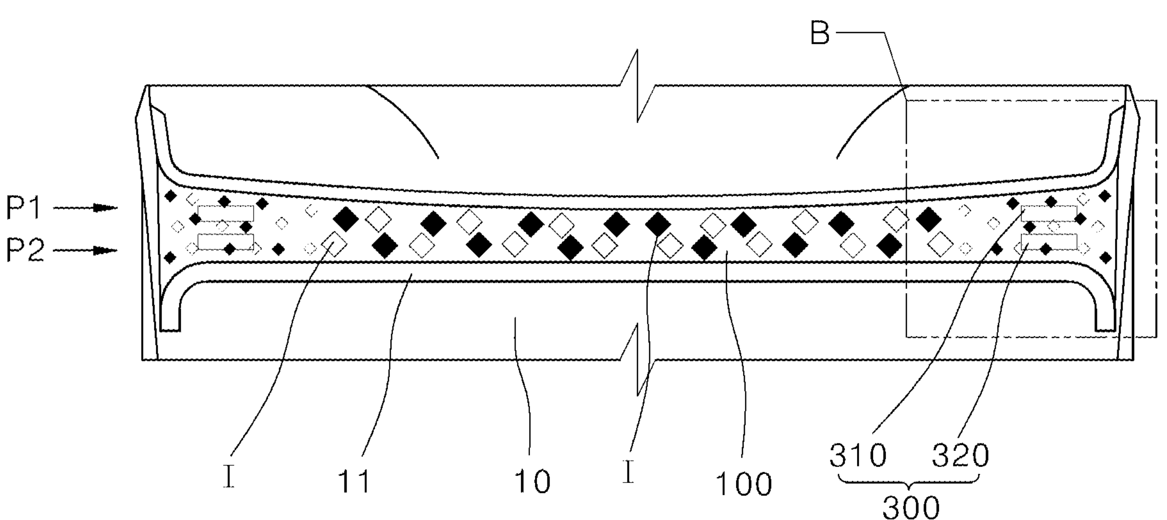
FIG. 5 is a front view showing the projector in a turned-on state in the lighting device for a vehicle according to embodiments of the present disclosure.
Figure 6:
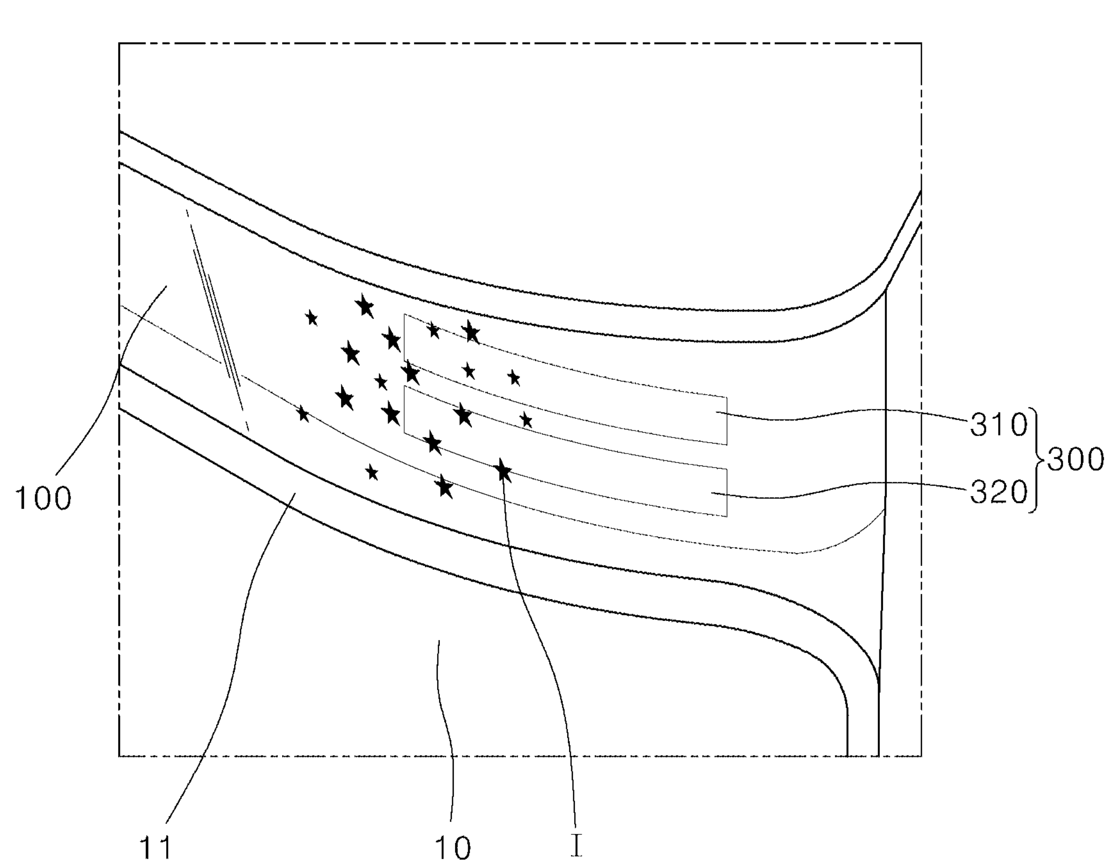
FIG. 6 is an enlarged perspective view of portion B of FIG. 5.
Figure 7:
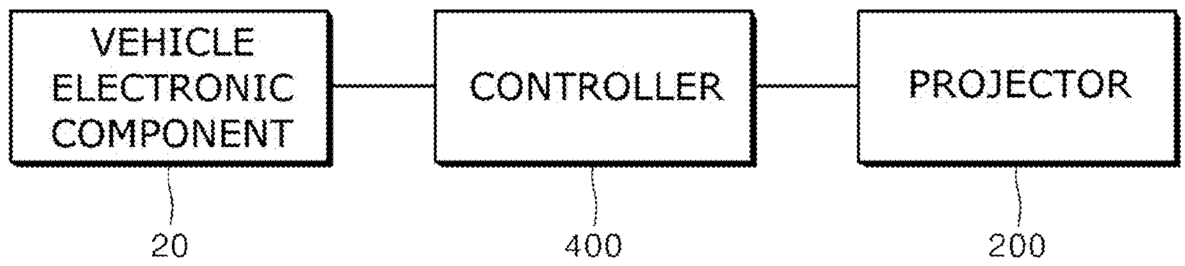
FIG. 7 is a block diagram showing an interconnection between a controller and each component in the lighting device for a vehicle according to embodiments of the present disclosure.

FIG. 1 is a front view of a lighting device for a vehicle according to embodiments of the present disclosure, when viewed from the front of a vehicle body. FIG. 2 is a top view of the lighting device for a vehicle according to embodiments of the present disclosure, when viewed from above the vehicle body. FIG. 3 is a front view showing a projector in a turned-off state in the lighting device for a vehicle according to embodiments of the present disclosure. FIG. 4 is an enlarged perspective view of portion A of FIG. 3. FIG. 5 is a front view showing the projector in a turned-on state in the lighting device for a vehicle according to embodiments of the present disclosure. FIG. 6 is an enlarged perspective view of portion B of FIG. 5. FIG. 7 is a block diagram showing an interconnection between a controller and each component in the lighting device for a vehicle according to embodiments of the present disclosure.

Referring to FIGS. 1 to 7, the lighting device for a vehicle according to embodiments of the present disclosure includes an outer lens 100, a projector 200, and a lamp 300, which will described in detail below.

The outer lens 100 may be mounted on a vehicle body 1. The outer lens 100 may be mounted on a grille 11 provided on a front part 10 of the vehicle body 1. Here, the grille 11 may refer to a portion, on which a radiator grille is mounted, of the front part 10 of the vehicle body 1.

The outer lens 100 may be formed approximately in a plate shape. A rim may be fixedly installed on the front part 10 to entirely surround the grille 11. A space may be provided between the outer lens 100 and the vehicle body 1.

The outer lens 100 may be exposed to the outside, and may be made of a transparent material that transmits light. For example, the outer lens 100 may include a plastic material such as polycarbonate.

The outer lens 100 according to embodiments of the present disclosure may include a lens 110 and a film 120. The lens 110 may include a transparent material that transmits light.

The film 120 may be coupled to the lens 110. The film 120 may be provided on a surface, facing an inner side of the front part 10, of the lens 110.

The film 120 may be integrally formed with the lens 110, and may be bonded or attached to the lens 110. The film 120 may include a translucent material onto which an image I is projected.

The projector 200 may be positioned within the outer lens 100. To be more specific, the projector 200 may be positioned at the rear of the outer lens 100. The projector 200 may be arranged to be spaced apart from the outer lens 100. The projector 200 may be arranged to face the outer lens 100.

The projector 200 may project the image I onto the outer lens 100. The projector 200 may be exemplified by a beam projector. The projector 200 may emit a beam containing data of the image I toward the rear of the outer lens 100, so that the image I in various shapes may be projected onto the outer lens 100.

The image I projected onto the outer lens 100 may be recognized externally through the outer lens 100. The image I may be exemplified by a cinematic video image, a three-dimensional light-emitting image, and the like.

The image I may be displayed on the outer lens 100 as a three-dimensional light-emitting image I through synthesizing light emitted from the projector 200 and light emitted from the lamp 300, which will be described later.

As shown in FIGS. 3 and 4, when the projector 200 is turned-off, a typical illuminated image from the lamp 300 may be implemented, as seen in a conventional vehicle.

As shown in FIGS. 5 and 6, when the projector 200 is turned-on, the light from the lamp 300 and the light with motion and cinematic effects may be interlinked to implement the image I that emits light. That is, when viewed from the outside, the image I may be implemented as a synthesis of the light from the lamp 300 and the light from the projector 200.

The lighting device for a vehicle according to embodiments of the present disclosure may further include a controller 400. The controller 40 may be provided inside the vehicle body 1 or inside the outer lens 100.

The controller 400 may be electrically connected to the projector 200, and may control the projector 200 by receiving an operating signal from a vehicle electronic component 20. The controller 400 may be a PCB board, and may be connected to and receive power from a power supply device such as a battery, an alternator, and the like mounted on the vehicle body 1.

Here, the vehicle electronic component 20 may be exemplified by: driving systems including a starting system, a charging system, an ignition system, an engine management system (EMS), an electronic control transmission (ECT) system, an electronic control drive system (a trans-axle control system, TACS), and an electronic control four-wheel drive system (EC 4WD); safety systems including an electronic control braking system (an anti-lock braking system, ABS), a collision avoidance braking system (an automatic braking system, ABS), an electronic control suspension (ECS) system, an electronic control power steering (EPS) system, a front & back warning system (FBWS), an adaptive front light system (AFS), a tire pressure warning system (TPWS), a before service warning system (BSWS), and an airbag system (a supplemental restraint system, SRS); and convenience systems including a lighting system, an instrument cluster, a body convenience system (BCS), an automatic temperature control system (ATCS), an air quality system (AQS), an audio & video system (AV system), and a trip computer.

The controller 400 may receive an operating signal from the vehicle electronic component 20 to control an operation of the projector 200. To be more specific, the controller 400 may be electrically connected to various vehicle electronic components 20 mounted in the vehicle to receive operating signals from each of the vehicle electronic components 20.

For example, when an occupant approaches the vehicle, unlocks the vehicle's door, or enters the vehicle, an operating signal generated by the corresponding vehicle electronic component 20 is received by the controller 400. Then, the turned-off projector 200 may be turned-on, creating an impression of displaying a welcome sequence operation.

The lamp 300 may be arranged between the outer lens 100 and the projector 200. The lamp 300 may be arranged to face the outer lens 100. The lamp 300 may emit light toward the rear of the outer lens 100. The lamp 300 may include a light-emitting diode (LED).

The light emitted from the lamp 300 may pass through the outer lens 100 and be emitted toward the front of the vehicle body 1. The lamp 300 may be exemplified by a head light. The lamp 300 may include a first lamp 310 and a second lamp 320.

The first lamp 310 may be arranged at a first position P1 of the grille 11. Here, the first position P1 may refer to an upper portion of the grille 11.

The first lamps 310 may be arranged on both sides of the grille 11, respectively. To be more specific, a pair of the first lamps 310 may be arranged on both sides of the vehicle body 1 in the width direction, respectively. The first lamp 310 may be exemplified by a low beam headlight that remains turned-on at night.

The second lamp 320 may be arranged at a second position P2, spaced apart from the first position P1, of the grille 11. Here, the second position P2 may refer to a lower portion of the grille 11. That is, the first lamp 310 and the second lamp 320 may be arranged vertically.

The second lamps 320 may be arranged on both sides of the grille 11, respectively. To be more specific, a pair of the second lamps 320 may be arranged on both sides of the vehicle body 1 in the width direction, respectively. The second lamp 320 may be exemplified by a high beam headlight.

In one embodiment, the image I according to embodiments of the present disclosure may gradually decrease in size toward both sides of the outer lens 100. To be more specific, to create a natural boundary between the translucent film 120 onto which the image I is projected and the transparent first and second lamps 310 and 320, a gradation effect may be applied. The gradation effect causes the image I to gradually decrease in size along the width direction of the vehicle body 1, that is, from both sides of the outer lens 100, where the first lamp 310 and the second lamp 320 are arranged, respectively, toward both ends thereof.

In another embodiment, to create a natural boundary between the lens 110 made of a transparent material and the film 120 made of a translucent material, the image I may vary in size, shape, or the like to gradually become smaller or larger. In other words, the image I may vary in size, shape, or the like to gradually become smaller or larger at the boundary between the lens 110 made of a transparent material and the film 120 made of a translucent material.

The lighting device for a vehicle according to embodiments of the present disclosure may generate a high-dimensional image by combining the light from the lamp 300 and the lighting effect from the projector 200.

The lighting device for a vehicle according to embodiments of the present disclosure may offer distinctive product quality by providing both non-illuminated and illuminated images, as well as various distinctive lighting effects depending on the mode.

The lighting device for a vehicle according to embodiments of the present disclosure may enable weight reduction and structural simplification by replacing a conventional complex injection-molded structure used for producing a lighting effect with a visual effect.

Although the present disclosure has been described with reference to the embodiments illustrated in the drawings, the embodiments are for illustrative purposes only, and those skilled in the art will appreciate that various modifications and other equivalent embodiments are possible from the embodiments. Thus, the true technical scope of the present disclosure should be defined by the following claims.

What is claimed is:

1. A lighting device for a vehicle, the lighting device comprising:

an outer lens, disposed on a vehicle body;

a projector positioned within the outer lens, arranged behind the outer lens in an optical projecting direction, and configured to project an image onto the outer lens; and a lamp arranged between the outer lens and the projector, arranged to face the outer lens, and configured to emit light toward the outer lens.

2. The lighting device of claim 1, wherein the outer lens is disposed on a front part of the vehicle body.

3. The lighting device of claim 1, wherein the outer lens comprises:

a lens; and a film, coupled to the lens, onto which the image is projected.

4. The lighting device of claim 3, wherein the lens is made of a transparent material.

5. The lighting device of claim 4, wherein the film is made of a translucent material.

6. The lighting device of claim 3, wherein the film is arranged on a surface of the lens that faces an inner side of the vehicle body.

7. The lighting device of claim 3, wherein the image projected onto the film is varied at a boundary between the lens and the film.

8. The lighting device of claim 1, wherein the image is displayed as a three-dimensional, light-emitting image by synthesizing light emitted from the lamp and light projected by the projector.

9. The lighting device of claim 1, further comprising a controller electrically connected to the projector, the controller being configured to control an operation of the projector by receiving an operating signal from a vehicle electronic component.

10. The lighting device of claim 1, wherein the lamp comprises:

a first lamp arranged at a first position on the vehicle body; and a second lamp arranged at a second position on the vehicle body, spaced apart from the first position.

11. The lighting device of claim 10, wherein the first lamp and the second lamp are arranged in a vertical arrangement relative to each other.

12. The lighting device of claim 10, wherein the first lamp and the second lamp are arranged on opposite sides of the vehicle body, respectively.

13. The lighting device of claim 1, wherein the light emitted from the lamp and the light projected by the projector interact to create a three-dimensional image on or through the outer lens.

14. The lighting device of claim 1, wherein a rim of the outer lens is fixedly installed to the vehicle body.

15. The lighting device of claim 1, wherein the outer lens comprises:

a lens; and a film, integrally formed with the lens, onto which the image is projected.

16. The lighting device of claim 1, wherein the image projected onto the outer lens is recognizable from outside through the outer lens.

17. The lighting device of claim 16, wherein the image projected onto the outer lens is formed by a combination of light emitted from the projector and light emitted from the lamp.

* * * * *